United States Patent [19]

Bennett

[11] Patent Number: 5,302,473
[45] Date of Patent: Apr. 12, 1994

[54] CURRENT COLLECTOR FOR ELECTROCHEMICAL DEVICE

[75] Inventor: William R. Bennett, North Olmsted, Ohio

[73] Assignee: Westinghouse Electric Corp., Pittsburgh, Pa.

[21] Appl. No.: 916,349

[22] Filed: Jul. 20, 1992

[51] Int. Cl.⁵ .............................................. H01M 2/24
[52] U.S. Cl. ..................................... 429/160; 429/178
[58] Field of Search ............... 429/160, 152, 209, 211, 429/210, 212, 217, 178

[56] References Cited

U.S. PATENT DOCUMENTS 4,166,156  8/1979  Ludwig .............................. 429/104
4,288,506  9/1981  Coetzer et al. ...................... 429/199
4,832,805  5/1989  LaConti et al. ........................ 204/98

*Primary Examiner*—Glennon H. Hollrah
*Assistant Examiner*—Brian M. Burn
*Attorney, Agent, or Firm*—Dean Schron

[57] ABSTRACT

A current collector for use in a battery wherein the current collector is coaxial with the battery axis and is fabricated with a plurality of pairs of layers of electrically conducting material with alternate layers having different conductivities. An anisotropic resistivity structure is thus formed having a greater resistance in the axial direction than in a radial direction relative to the axis so as to provide for a more uniform current distribution.

7 Claims, 3 Drawing Sheets

CURRENT COLLECTOR FOR ELECTROCHEMICAL DEVICE

BACKGROUND OF THE INVENTION

Field of the Invention

The invention in general relates to a current collector for use in an electrochemical device, and more particularly, to a collector which will provide for more even distribution of current.

Background Information

In certain types of electrochemical devices such as bipolar, multi-cell, high power density batteries, current collectors are utilized for distribution of the generated current to an external device by way of battery terminals connected to the current collectors.

In many designs, at least one such terminal is connected to the central portion of the current collector so that distribution of current, provided by the cells of the battery, is as uniform as possible. With a relatively thin current collector, however, current density is non-uniform. That is, the current density is greater in the general vicinity of the terminal connection to the current collector, and decreases as a function of distance away from the connection.

This non-uniform current distribution results in a less efficient battery, and to correct it, the current collector may be made more massive or alternatively, multiple terminals may be distributed over the surface of the current collector. Such remedies, however, adds undesirable weight to the battery system and use of multiple terminals increases the complexity of fabrication and objectionally provides additional paths for heat loss from battery systems which operate at high temperatures.

The present invention provides for a current collector which significantly improves the current distribution without adding weight, complexity or additional heat loss to the battery system.

SUMMARY OF THE INVENTION

A current collector structure is provided for a multi-cell battery such as one of a bipolar construction which has a stack of cells lying along a battery axis. The current collector includes a plurality of layers of electrically conductive material with adjacent layers of the materials being of different conductivities to form an anisotropic resistivity structure having a greater resistivity in the direction of the axis. An end cell of the multi-cell arrangement is in electrical contact with the current collector on one side thereof and a terminal is provided which is electrically connected to the current collector. In one embodiment, the terminal is connected directly to the current collector and is coaxial with the battery axis.

DESCRIPTION OF THE PREFERRED EMBODIMENT

Figure 1:
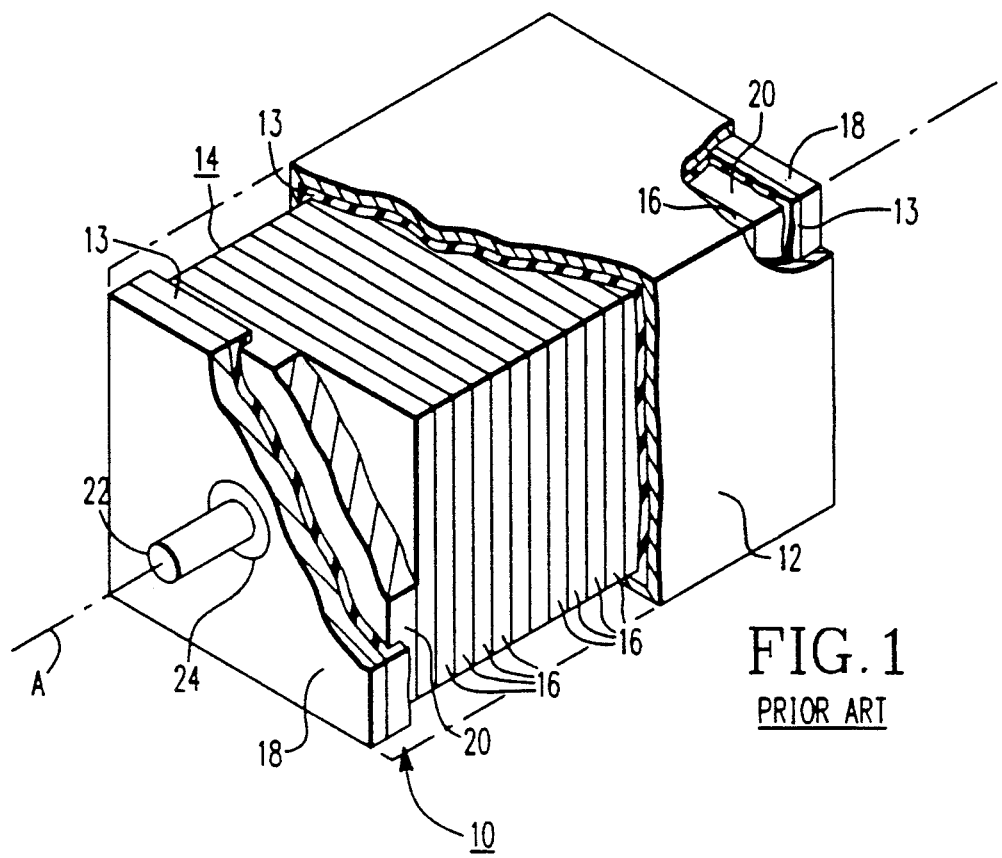
FIG. 1 is a view, with portions broken away, of a typical multi-cell bipolar battery in which the present invention may be used.
Figure 2:
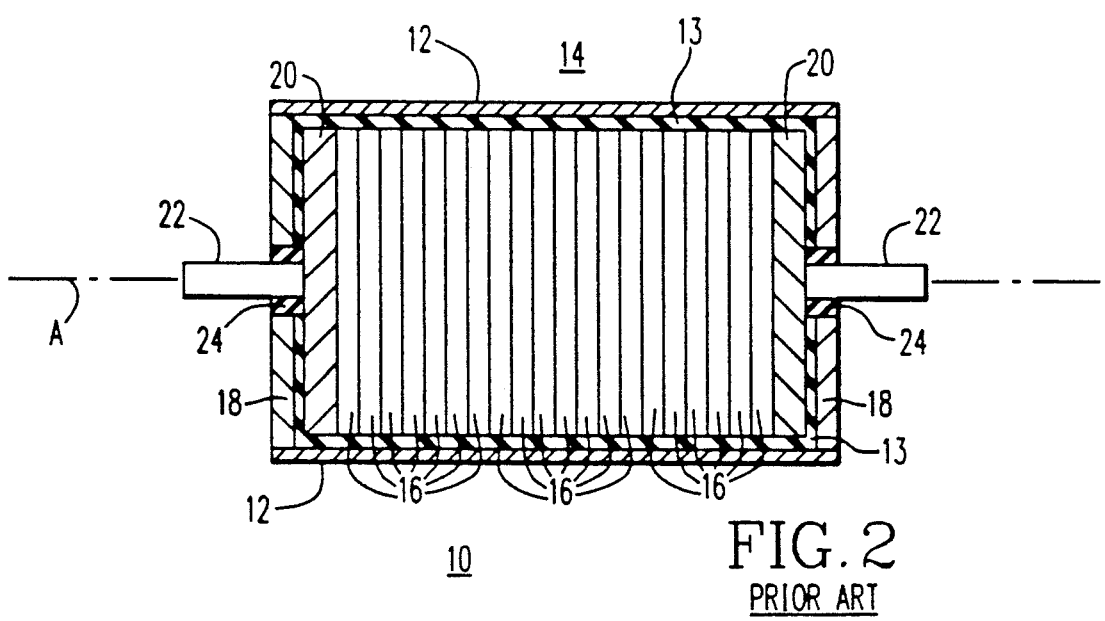
FIG. 2 is an axial cross-sectional view of the battery illustrated in FIG. 1.

Referring now to FIGS. 1 and 2, the invention will be described, by way of example, with respect to a bipolar, multi-cell, high power density battery such as battery 10 illustrated in FIG. 1.

Contained within a metallic case 12 is a stack 14 of individual bipolar cells 16 which lie along the battery axis A and are electrically insulated from case 12 by means of insulation 17. Disposed behind each end plate 18 is a respective current collector 20, each in electrical contact with an end cell of the stack 14, and each being electrically connected to a terminal 22, coaxial with axis A. A terminal 22 projects through an end plate 18 and is sealed and insulated therefrom by a seal/insulator assembly 24. One of the current collectors 20 is often referred to as a positive current collector while the other is referred to as a negative current collector.

Figure 3:
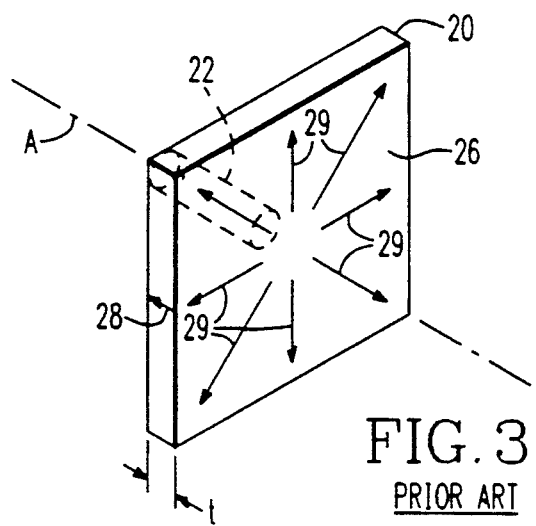
FIG. 3 is an isometric view and FIG. 4 a side view of a current collector of the battery illustrated in FIG. 2.
Figure 4:
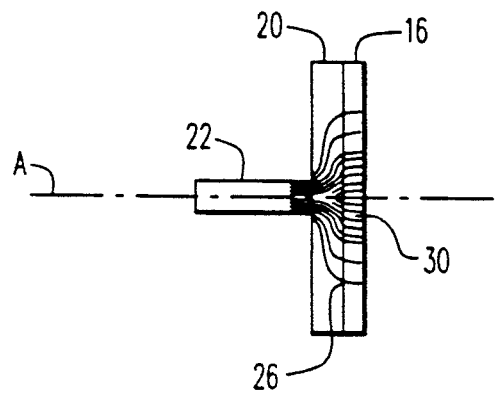

FIG. 3 illustrates a current collector 20 with attached terminal 22. The current collector 20 is in the form of a metal plate having a thickness t and a front surface 26 which lies in a plane perpendicular to axis A. The front surface 26 contacts an end cell 16 of the multi-cell array, as illustrated in FIG. 4, to which additional reference is made. The collector is relatively thin, and the preferred direction of current from the outside surface 26 to the terminal 22 is along a path of least resistance, as generally represented by arrow 28. Radial paths, as represented by arrows 29 present longer, and therefore higher resistance paths. Accordingly, there is less resistance from the front surface 26 to the terminal 22 nearer the axis A, and this has the effect of concentrating the current, as illustrated by current lines 30 in FIG. 4, closer to the central axis; this concentration defines an objectional non-uniform current distribution.

Figure 5:
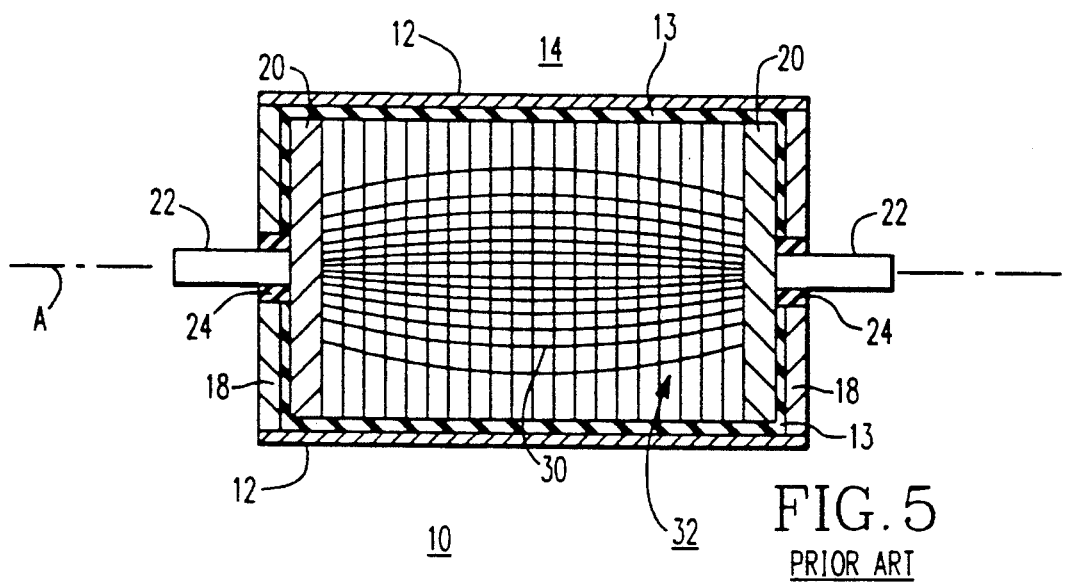
FIG. 5 is a cross-sectional view, as in FIG. 2, illustrating one of the problems resulting from the prior art construction.

FIG. 5 illustrates the non-uniform current distribution throughout the whole battery from one current collector to the other and it is seen that sections 32 of the multi-cell stack 14 are unused. It is desired that the current distribution be uniform over an entire bipolar cell; unused portion of the cells result in an inefficient battery having lower power and energy ratings.

In order to improve the current distribution over the entire face of the current collectors 20, the thickness t may be greatly increased such that the radial and axial resistances are similar. This solution, however, adds objectional weight to the battery, and if size constraints are imposed, cells will have to be removed to accommodate the more massive current collectors, resulting in a lower battery output.

The present invention solves this problem with a current collector which not only provides for a uniform current distribution, but does so without increasing the weight of the collector itself.

Figure 6:
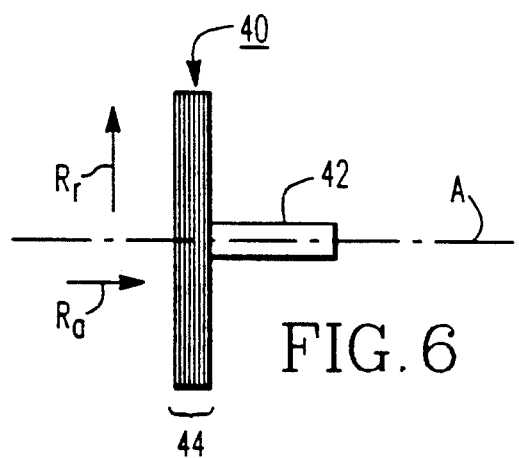
FIG. 6 is a side-view of an improved current collector in accordance with the present invention.

One embodiment of the invention is illustrated in FIG. 6 wherein there is illustrated a current collector 40 electrically connected to a terminal 42. The collector 40 is comprised of a plurality of layers 44 of electrically conductive material, with adjacent layers of the material forming a pair, with the two layers of the pair being of different conductivities. With a plurality of such pairs, there is formed an anisotropic resistivity structure which has a greater resistivity in the axial direction as indicated by arrow $R_a$ and a relatively lower resistivity in the radial direction as represented, for example, by arrow $R_r$.

Figure 7:
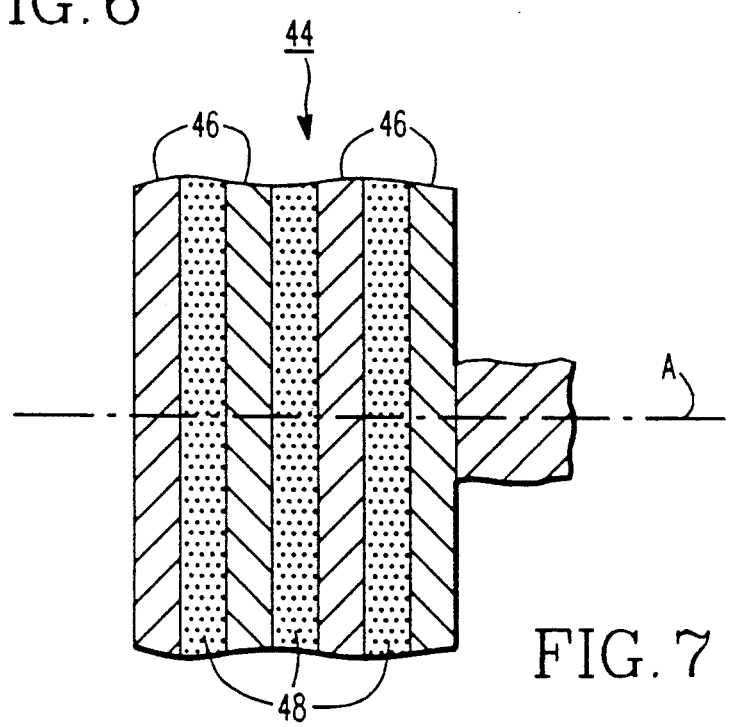
FIG. 7 is an enlarged view of a portion of the current collector of FIG. 6.

FIG. 7 illustrates a portion of the current collector in cross-section and further illustrates the plurality of pairs of alternately different conductivities. The anisotropic resistivity structure may be formed of a plurality of metal layers 46 such as a nickel foil having a relatively high conductivity and therefore a relatively low resistance. Alternating between these metallic layers 46 are layers 48 of a lower conductivity and therefore higher resistivity material, one example of which may be a powdered metal dispersed in a resin matrix. One example of layer 48 may be an electrically conducting epoxy. It is to be understood that the metallic foil and conducting epoxy layers are given merely by way of example and that other materials having different conductivities would suffice, including alternate layers of different conductivity metals or alloys.

Accordingly, with the structure of FIG. 6 (and FIG. 7) the preferred current direction is radially as opposed to axially, thereby providing for a more uniform current distribution over the entire surface of the current collector to bring into effect, substantially the entire surface area of the bipolar cells of the multi-cell stack 14. Further, by providing a plurality of pairs (46, 48) of higher/lower conductivity layers, the current collector may be tailored to have predetermined resistance properties.

Figure 8:
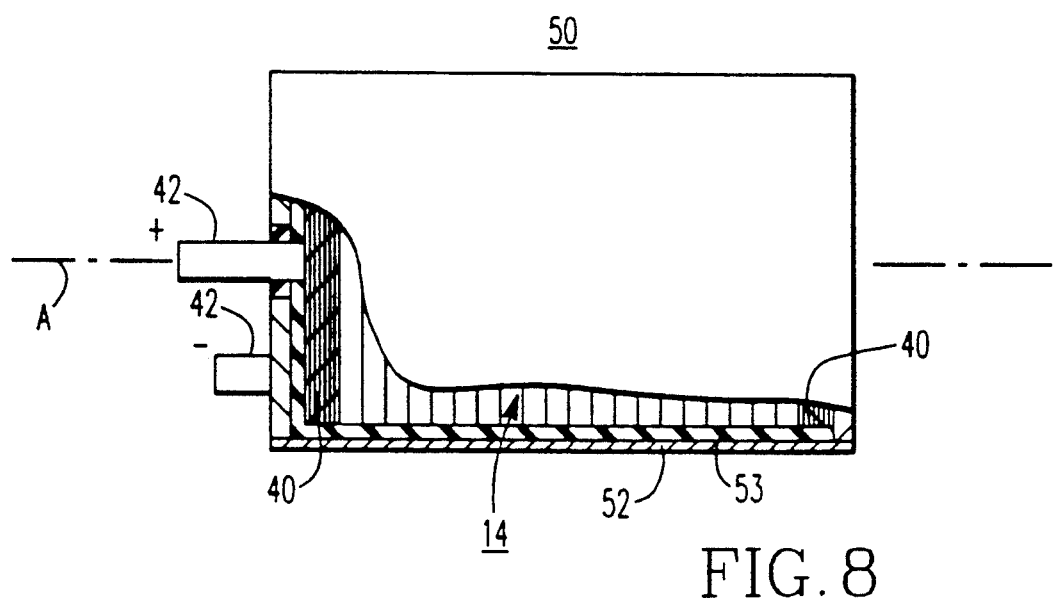
FIG. 8 illustrates a battery with an alternate terminal arrangement.

In FIG. 8, there is illustrated a battery 50 which incorporates the improved current collectors 40 but which is of slightly different construction than that illustrated in FIG. 1. For example, current collector 40 on the left-hand side of the illustration is the positive current collector and is connected to positive terminal 42 coaxial with the battery axis A. Current collector 40, on the right-hand side of the illustration, is the negative current collector and is electrically connected to the negative terminal 42 by means of the metallic case 52 electrically insulated from the stack of cells 14 by means of insulation 53. With this type of construction, electrical connection may be made to the battery at only one end thereof.

I claim:

1. A current collector structure for a multi-cell electrochemical device having a stack of cells lying along an axis, comprising:
    a) a plurality of pairs of layers of electrically conductive material;
    b) adjacent layers of each said pair being of different conductivities to form an anisotropic resistivity structure having a greater resistivity in the direction of said axis;
    c) said current collector being in electrical contact with an end cell of said stack; and
    d) a terminal electrically connected to said current collector.

2. Apparatus according to claim 1 wherein:
    a) the surface of said current collector is in a plane perpendicular to said axis.

3. Apparatus according to claim 1 wherein:
    a) said terminal is coaxial with said axis.

4. Apparatus according to claim 1 wherein:
    a) at least one of said layers is comprised of a metallic foil.

5. Apparatus according to claim 4 wherein:
    a) at least another of said layers is comprised of a powdered metal dispersed in a resin matrix.

6. Apparatus according to claim 1 wherein:
    a) said electrochemical device is a battery.

7. Apparatus according to claim 6 wherein:
    a) said battery includes first and second ones of said current collectors each electrically connected to respective first and second ones of said terminals.

* * * * *